United States Patent
Henry

[11] 3,711,104
[45] Jan. 16, 1973

[54] SEAL ASSEMBLY

[75] Inventor: Ralph E. Henry, Rixford, Pa.

[73] Assignee: Dresser Industries, Inc., Dallas, Tex.

[22] Filed: March 16, 1971

[21] Appl. No.: 124,896

[52] U.S. Cl. ................... 277/58, 277/154, 277/156, 277/157, 277/193
[51] Int. Cl. ............................................. F16j 15/00
[58] Field of Search ..92/165, 166, 167, 168; 277/27, 277/58, 154, 156, 157, 163, 155, 193, 197, 198

[56] References Cited

UNITED STATES PATENTS

| | | | |
|---|---|---|---|
| 3,305,241 | 2/1967 | Hart | 277/27 |
| 753,731 | 3/1904 | Pinch | 277/156 |
| 3,490,774 | 1/1970 | Henry | 277/58 |
| 754,065 | 3/1904 | Hodge | 277/58 X |
| 2,068,723 | 1/1937 | Wheeler | 277/154 X |
| 3,081,098 | 3/1963 | Stephens | 277/27 |
| 3,271,037 | 9/1966 | Hammond | 277/27 |
| 3,600,048 | 8/1971 | Makhobey | 277/27 |

FOREIGN PATENTS OR APPLICATIONS

| | | | |
|---|---|---|---|
| 113,795 | 12/1943 | Sweden | 286/24 |
| 141,623 | 2/1929 | Switzerland | 286/24 |

*Primary Examiner*—Edgar W. Geoghegan
*Assistant Examiner*—Irwin C. Cohen
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

The annular seal assembly and seal arrangements including the seal assembly disclosed are useful in high pressure pumps and compressors and the like that include a cylinder having annular grooves therein for receiving the seal arrangements and having a plunger reciprocating in the cylinder through the seal arrangements. The seal assembly includes segmented tangent and radial ring assemblies. Each of the segments in the tangent ring assembly includes tangentially disposed end surfaces that are arranged to sealingly and slidingly engage the adjacent tangentially disposed end surfaces. The radial ring assembly is constructed from a plurality of arcuate segments having an outer periphery sized to be closely fitted into a counterbore formed in one face of the tangent ring assembly. With the radial and tangential rings assembled, the forces exerted by the high pressure fluid on the tangent ring assembly are transferred to the radial ring assembly, providing better lubrication and longer seal life. The disclosed seal arrangements promote better operation and better seal life due to the distribution of the pressure load over several seals.

12 Claims, 4 Drawing Figures

INVENTOR
RALPH E. HENRY

Roy L. Van Winkle
ATTORNEY

SEAL ASSEMBLY

BACKGROUND OF THE INVENTION

This invention relates, generally, to annular seal assemblies for use in reciprocating pumps, compressors or the like. More particularly, and not by way of limitation, this invention relates to a pressure responsive annular seal assembly for such use.

Seals for use in compressors and pumps operating in the 25,000 psi pressure range have, in the past, been constructed from sets of segmented annular members with the joints between the segments being offset between adjacent annular members. One of the annular members, that is, the one on the low pressure side of the seal, functions to seal against the plunger or rod reciprocating in the compressor while the other annular member functions to close the joints between the segments of the first annular member. Such a seal structure is illustrated in U.S. Pat. No. 3,542,374 issued Nov. 24, 1970 to Kenneth E. Neilson, et al.

It will be noted in that patent, that the seal rings forming the seal assembly are constructed from segments having adjacent sealing faces. One ring has tangential end surfaces and the other ring has radial end surfaces with the end surfaces being circumferentially displaced. Seals constructed in this manner have performed in a generally satisfactory manner. However, in ultra high pressure service, considerable force is exerted on the rod or plunger by the seal rings due to the high pressure. Such high forces result in relatively poor lubricating characteristics and, thus, a short seal life due to the relatively high degree of wear thereon. In fact, the Neilson patent proposes the use of self-lubricating materials such as bronze filled Teflon for constructing the rings in an effort to reduce the wear problem.

An object of the invention is to provide an improved seal ring assembly for use in high pressure compressors and the like that provide excellent sealing characteristics and longer seal life.

Another object of the invention is to provide an improved seal assembly wherein the radial seal ring is utilized not only to seal the end surfaces of the tangential seal ring but to support a portion of the load imposed on the tangential seal ring by the pressure force and, thus, provide a greater seal life.

Still another object of the invention is to provide an improved seal structure that can be quickly and easily assembled, that is self-compensating for wear, and that affords a longer seal life.

A further object of the invention is to provide improved seal life through the use of an improved arrangement of seals that include the seal assembly described in detail hereinafter.

SUMMARY OF THE INVENTION

This invention provides an improved annular seal assembly for use in high pressure pumps and compressors or the like that include a cylinder having an annular groove therein for receiving the seal assembly and a plunger reciprocating in the cylinder through the seal assembly. The seal assembly includes a tangent ring constructed from a plurality of arcuate members having mating end surfaces defined by a plane extending generally tangent to the inner diameter and having a counterbore formed in one annular surface thereof.

The improved seal assembly also includes a radial ring that is constructed from a plurality of arcuate members that have radially disposed end surfaces that are offset relative to the end surfaces of the tangent ring. The radial ring assembly has an outside diameter sized to fit into the counterbore and a face that sealingly engages the tangent ring to seal the end surfaces thereof. The tangent ring and radial ring each have an inner diameter sized to engage the plunger. The tangent ring is in sealing engagement therewith while the radial ring provides support for a portion of the load imposed on the tangent ring by the pressure in the compressor.

The foregoing and additional objects and advantages of the invention will be more fully appreciated when the following detailed description is read in conjunction with the accompanying drawing.

BRIEF DESCRIPTION OF THE DRAWING

FIG. 1 is a partial cross sectional view illustrating the improved seal assembly of the invention located in a compressor, pump or the like.

FIG. 4 is a view similar to FIG. 1, but illustrating the improved seal in an improved combination or arrangement of seals in a compressor or the like.

DETAILED DESCRIPTION OF THE PREFERRED EMBODIMENT

Figure 1:
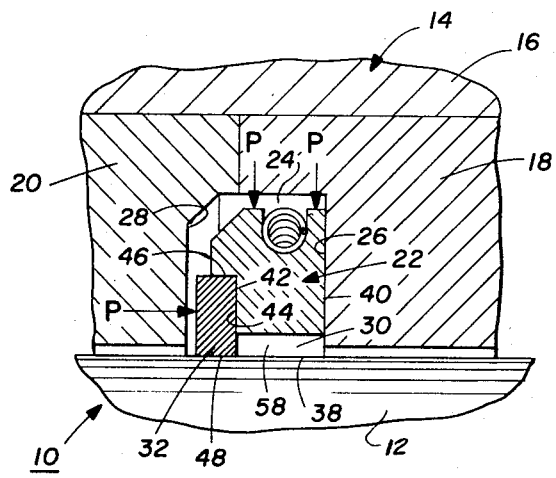

Referring to the drawing, the fragmentary view of FIG. 1 illustrates a compressor 10 having a plunger 12 reciprocally located in a cylinder 14. The cylinder 14 includes an exterior wall 16 of sufficient thickness to withstand the required internal pressure and a plurality of spacers 18 and 20. The spacers 18 and 20 are provided so that desired seals, which will include one or more of the seal assemblies 22, can be conveniently positioned in the compressor 10 (See FIG. 4.).

As shown in FIG. 1, the spacers 18 and 20 are formed with annular recesses providing an annular groove 24 that is sized to receive the seal assembly 22. The groove 24 includes a radial sealing surface 26 and a radial nonsealing surface 28.

Figure 2:
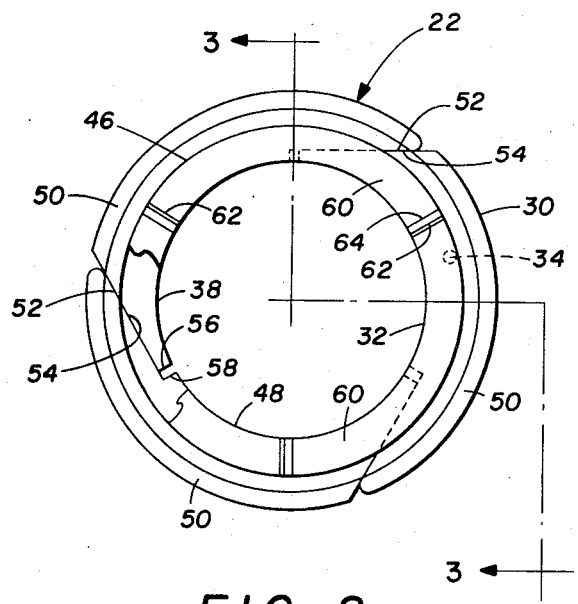
FIG. 2 is a plan view of the improved seal assembly, partially broken away, illustrating the structure of the seal of the invention in more detail.
Figure 3:
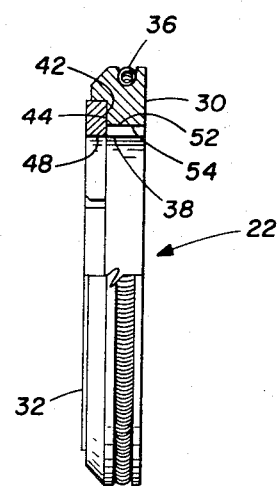
FIG. 3 is a half-sectional view of the seal assembly taken generally along the line 3—3 of FIG. 2.

The overall structure of the seal assembly 22 can be more clearly seen in FIGS. 2 and 3. As shown therein, the seal assembly 22 includes a tangent ring assembly 30, a radial ring assembly 32, a locating pin 34 that interconnects the ring assemblies 30 and 32 for purposes that will become apparent, and an annular spring 36 (See FIG. 3.) that encircles the tangent ring assembly 30. In FIG. 1, it can be seen that the tangent ring assembly 30 includes an inner periphery 38 that sealingly engages the plunger 12 and a seal face 40 that sealingly engages the sealing surface 26 of the spacer 18.

Formed in the face of the tangent ring assembly 30 on the opposite side from the seal face 40 is a counterbore 42 providing a second seal face 44. The counterbore 42 is sized to closely receive the outer periphery 46 of the radial ring assembly 32. The radial ring assembly 32 also has an inner periphery 48 that slidingly engages the plunger 12.

As shown in FIG. 2, the tangent ring assembly 30 includes three substantially identical arcuate members 50. Each of the arcuate members 50 has an end surface 52 defined by a plane that extends generally parallel to a tangent or, if desired, tangent to the inner periphery 38. The end surface 52 is in sealing engagement with and slidable relative to an end surface 54 that is formed on the opposite end of each of the members 50.

As shown most clearly in the broken out portion of FIG. 2, the end surface 52 terminates in a relatively small radially disposed surface 56. The end surface 54 terminates in the relatively small radially oriented surface 58. In the original assembled condition of the members 50, the surfaces 56 and 58 are in spaced relationship to permit a reduction in the diameter of the inner periphery 38 as wear occurs thereon.

The radial ring assembly 32 is composed of three substantially identical arcuate members 60. Each member 60 has radially disposed end surfaces 62 and 64. It will be noted that the end surfaces 62 and 64 on adjacent arcuate members 60 are spaced to permit a reduction in the diameter of the inner periphery 48 of the radial ring assembly 32 in the event that wear does occur thereon.

As previously mentioned, the pin 34 locates and retains the tangent ring assembly 30 and the radial ring assembly 32 in a fixed position relative to each other. The assemblies 30 and 32 are retained in such a position so that the end surfaces 62 and 64 of adjacent members 60 are offset from the adjacent end surfaces 52 and 54 of the members 50. With this arrangement, the radial ring assembly 32 closes and seals the space existing between the end surfaces 56 and 58 on adjacent members 50 of the tangent ring assembly 30. It will also be noted that the radial ring assembly 32 is preferably of greater axial thickness than the depth of the counterbore 42 so that the radial ring assembly 32 engages the face 28 when the seal assembly 22 moves to the left as will be described.

With the seal assembly 22 located in the annular groove 24 of the compressor 10 as illustrated in FIG. 1, the plunger 12 reciprocates to the left during the compression or pumping stroke and to the right on the intake stroke. As the plunger 12 moves to the left, and prior to opening of the compressor discharge valve (not shown) pressure builds up in the annular groove 24 as indicated by the arrows P. This pressure forces the seal assembly 22 to the right bringing the seal face 40 on the tangent ring assembly 30 into sealing engagement with the sealing surface 26 of the annular groove 24. The radial ring assembly 32 is also forced to the right by the pressure, sealingly engaging the second seal face 44 in the counterbore 42 and, thus, closing the opening between the end surfaces 52, 54, 56 and 58 on the tangent ring assembly 30.

Simultaneously, the pressure acts in a radial direction to force the tangent ring assembly 30 toward the plunger 12 bringing the inner periphery 38 thereon into sealing engagement with the exterior of the plunger 12. The radially inwardly directed force generated by the pressure is applied mechanically from the tangent ring assembly 30 to the outer periphery 46 of the radial ring assembly 32, forcing the inner periphery 48 of the radial ring assembly 32 into engagement with the plunger 12. The radial ring assembly 32 does not form a seal with the plunger 12, and, thus, provides only a means of distributing a portion of the load imposed by the pressure over a greater surface area, that is, over the total inner peripheral area 38 and 48 of the tangent ring assembly 30 and the radial ring assembly 32. Since the radial ring assembly 32 does not basically form a seal with the plunger 12, the radial pressure forces on the ID and OD of the radial ring assembly 32 nullify each other. The radial pressure force acting outwardly on the portion of the tangent ring assembly 30 that overhangs and forms the counterbore 42 for the radial ring assembly 32 counteracts the radially inwardly directed forces acting thereon. Consequently, the radial inward force on the seal assembly 22 acting on the plunger is determined by the peripheral pressure on the outer periphery of the tangent ring 30, between the radial planes formed by faces 44 and 40.

During the intake stroke of the plunger 12, that is, as the plunger 12 moves to the right as seen in FIG. 1, the pressure in the left hand portion of the annular groove 24 is reduced so that the seal assembly 22 moves to the left against face 28 permitting the higher pressure existing on the right hand side of the seal assembly 22 to bleed back around the tangent ring assembly 30 and through the spaces between the end surfaces of the radial ring assembly 32. As the pressure is relieved, the pressure imposed load on the seal assembly 22 decreases to further reduce the wear on the seal assembly 22 on the intake stroke and, thus, prolong the life of the seal.

From the foregoing, it can be appreciated that the seal assembly 22 constructed in accordance with the invention, provides a longer lasting seal structure for use in high pressure compressors, pumps and the like since the pressure load imposed on the sealing surface in substantially reduced as compared to previously known seals. The reduction in seal load results from the use of the radial ring assembly to support a portion of the pressure load; the pressure differential structure of the tangent ring assembly which reduces the effective pressure on the seal assembly; and, the application of the pressure load over the total inner peripheral area of both the tangent ring assembly and the radial ring assembly. The reduction of the unit pressure of the seal assembly on the plunger has the further advantage of promoting better lubrication which will further increase the life of the seal.

THE SEAL ARRANGEMENT OF FIG. 4

Figure 4:
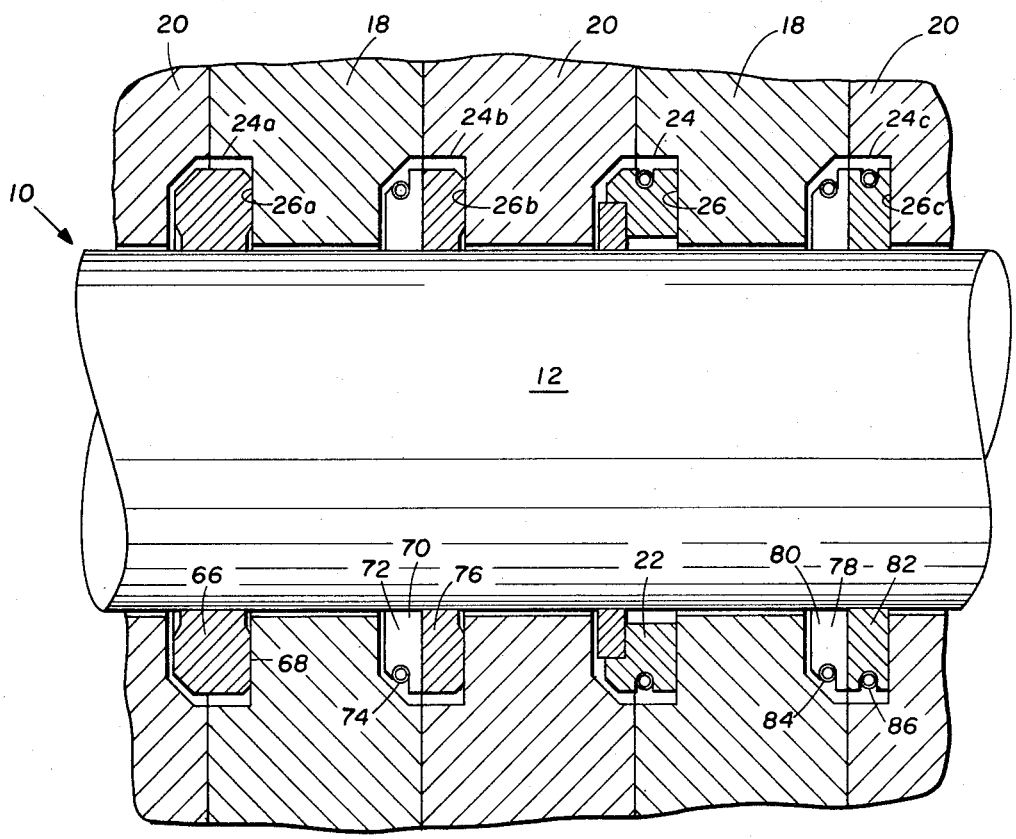

FIG. 4 illustrates one arrangement of seals in which the seal assembly 22 can be used to advantage in a compressor 10. As is shown therein, a plurality of the spacers 18 and 20 have been located in the cylinder 14. It should be understood that various types of spacers can be utilized depending upon the desired location and the type of seals used in the arrangement.

For ease of description, the annular grooves for receiving the various seals and seal assemblies have been designated as 24, 24a, 24b, and 24c. The seal assembly 22 which has been previously described in detail, is located in the annular groove 24.

An annular seal member 66 is located in the annular groove 24a. The annular seal member 66 is of unitary construction and has its inner periphery adjacent to, but not in sealing engagement with the plunger 12. A radially disposed surface 68 thereon is movable into sealing engagement with a surface 26a of the groove 24a. The seal member 66 is subjected to the full compression pressure of the compressor 10 which acts to bring the seal toward sealing engagement with the plunger. Leakage does exist to reduce the differential across the seal member 66 and alleviate, at least to some extent, the shock loading imposed thereon as the plunger 12 reciprocates.

Located in the annular groove 24b is a seal assembly 70 that consists of a composite ring 72 constructed from a plurality of arcuate segments having radially disposed end portions similar to the structure of the radial ring assembly 32. The composite ring 72 has an annular spring 74 encircling its outer periphery that biases the composite ring 72 relatively toward the plunger 12. The seal assembly 70 also includes a ring 76 of unitary construction.

The ring 76 sealingly engages the composite ring 72 and also sealingly engages the surface 26b during the compression stroke of the plunger 12. The ring 76 also has a small clearance with the plunger 12 and, thus, permits some leakage thereby, reducing the differential thereacross and also alleviating the shock loading during reciprocation of the plunger 12.

The seal assembly 22, which is disposed in the annular groove 24, has been previously described in detail and no further description will be made here except to point out that the seal assembly 22 also permits some leakage during the compression stroke of the plunger 12 to further distribute the pressure differential across the seal arrangement. The seal member 66, the seal assembly 70, and the seal assembly 22, each provide a progressively more efficient seal with the plunger 12 so that the pressure differential is progressively reduced as the pressure load is taken from the left of FIG. 4 to the right of FIG. 4. The left side of FIG. 4 would represent the fluid end while the right side of FIG. 4 would represent the power end of the compressor 10.

Located in the annular groove 24c is a seal assembly 78. The seal assembly 78 includes a composite ring 80 constructed from a plurality of arcuate segments having radially disposed end portions as described in connection with the radial ring assembly 32. Positioned adjacent to the composite ring 80 is a composite ring 82 that is constructed from a plurality of arcuate segments having generally tangentially disposed end portions somewhat similar to the tangent ring assembly 30 of the seal assembly 22. The composite rings 80 and 82 are each biased relatively toward the plunger 12 by annular springs 84 and 86, respectively, that are located in the outer peripheries thereof.

During the compression stroke of the plunger 12, the composite rings 80 and 82 are disposed in sealing engagement along the juxtaposed radial surfaces therebetween. The composite ring 82 also sealingly engages the surface 26c of the annular groove 24c.

The seal assembly 78 is probably the most fragile of the seals shown in the arrangement of FIG. 4, but with the seal assembly 78 positioned as shown, it is subjected to the lowest differential in pressure and the lowest shock loading. It can be appreciated from viewing the construction of the various seals and seal assemblies of FIG. 4 that each of the seals is less rugged in construction and more efficient in sealing beginning with the seal ring 66. This is important in that the seals are not only exposed to a progressively lower differential in pressure, but are also exposed to a considerably lower shock loading which results from the pulsating pressures introduced by the reciprocating plunger 12.

The arrangement described is presented by way of example only, and it will be apparent that various arrangements of seals could be utilized, that is, several of the seal assemblies 22 could be placed in succession, various ones of the seals may be omitted, and modifications of the seals shown could be utilized to change either the mechanical strength thereof or to increase or decrease the sealing efficiency so that the optimum operating characteristics will be attained. In any event, distribution of the pressure differential and shock load over a group of seals reduces the stresses thereon, improves lubrication and, consequently, provides improved seal life and better cylinder performance.

The foregoing detailed description of the preferred embodiment is presented by way of example only and it will be understood that many changes and modifications can be made thereto without departing from the spirit and scope of the invention.

The embodiments of the invention in which an exclusive property or privilege is claimed are defined as follows:

1. An annular seal assembly for use in high pressure pumps and compressors or the like including a cylinder having an annular groove therein for receiving said seal assembly, the groove having first and second radial walls and a plunger reciprocating in the cylinder through said seal assembly, said seal assembly comprising:

a tangent ring assembly having an outer periphery receivable in the groove, an inner periphery sealingly engaging the plunger and defining an inner diameter, an annular first face having a counterbore therein forming a seal surface and an annular second face arranged to sealingly engage one radial wall of the cylinder groove, said tangent ring assembly including a plurality of arcuate members having mating end surfaces defined by planes extending generally tangent to said inner diameter; and, a radial ring assembly having an inner periphery engaging the plunger, an outer periphery fitting into said counterbore, said counterbore has a depth that is less than the thickness of the radial ring assembly, and an annular face sealingly engaged with said seal surface, said radial ring assembly including a plurality of arcuate members having radially disposed end surfaces offset relative to the end surfaces of said tangent ring assembly.

2. The seal assembly of claim 1 wherein the end surfaces of the arcuate members forming said tangent ring are slidable relative to each other and are sealingly engageable.

3. The seal assembly of claim 2 wherein the end surfaces on adjacent arcuate members forming said radial ring assembly are located in spaced relationship.

4. The seal assembly of claim 1 and also including means holding said seal assembly in the annular configuration and resiliently biasing said seal assembly toward the plunger when located in the cylinder groove.

5. The seal assembly of claim 1 wherein each of the mating end surfaces on said tangent members includes:
a tangent portion defined by a plane tangent to a circle having a diameter larger than said inner diameter and smaller than said outer periphery; and,
a radial portion defined by a plane passing through the axis of said annular seal assembly and intersecting said tangent portion.

6. The seal assembly of claim 5 wherein:
said tangent portions of adjacent arcuate members forming said tangent ring are in sliding and sealing engagement; and,
said radial portions of adjacent arcuate members forming said tangent ring are in spaced relationship.

7. the seal assembly of claim 6 and also including annular spring means encircling said tangent ring assembly for biasing said tangent ring assembly in a direction to sealingly engage the plunger when said annular seal assembly is located in the cylinder.

8. The seal assembly of claim 7 and also including means engaging said tangent ring assembly and said radial ring assembly for retaining said ring assemblies against relative rotation whereby the end surfaces on said ring assemblies are held in offset relationship.

9. An arrangement of annular seals for use in high pressure pumps and compressors or the like that includes a cylinder having spaced annular grooves for receiving said seals, the grooves having first and second radial walls and a plunger reciprocating in the cylinder through said seals, said arrangement comprising:
a first annular seal of unitary construction receivable in one groove and arranged to sealingly engage the plunger and one radial wall of the groove; and,
a first annular seal assembly receivable in a second groove and including
a tangent ring assembly having an outer periphery receivable in the second groove, an inner periphery sealingly engaging the plunger and defining an inner diameter, an annular first face having a counterbore therein forming a seal surface and an annular second face arranged to sealingly engage one radial wall of the second groove, said tangent ring assembly including a plurality of arcuate members having mating end surfaces defined by planes extending generally tangent to said inner diameter, and
a radial ring assembly having an inner periphery engaging the plunger, an outer periphery fitting into said counterbore, said counterbore has a depth that is less than the thickness of the radial ring assembly, and an annular face sealingly engaged with said seal surface, said radial ring assembly including a plurality of arcuate members having radially disposed end surfaces offset relative to the end surface of said tangent ring assembly.

10. The arrangement of claim 9 and also including a second annular seal assembly arranged to be disposed in a third groove in the cylinder, said second annular seal assembly comprising:
an annular member of unitary construction sealingly engaging the plunger;
a composite ring including a plurality of arcuate segments located adjacent to and sealingly engageable with said annular member; and,
resilient means biasing said composite ring toward the plunger.

11. The arrangement of claim 10 and also including a third annular seal assembly arranged to be disposed in a fourth groove in the cylinder, said third annular seal assembly comprising:
a second composite ring including a plurality of arcuate segments having radial end portions;
a third composite ring including a plurality of arcuate segments having generally tangentially disposed end portions and a surface sealingly engaging said second composite ring, said radial end portions being circumferentially displaced from said tangentially disposed end surfaces; and,
resilient means encircling each of said second and third composite rings biasing said rings toward the plunger.

12. The arrangement of claim 11 wherein the compressor, pump or the like includes a power end and a fluid end and wherein:
said first annular seal is located adjacent said fluid end;
said second annular seal assembly is located between said first annular seal and the power end;
said first annular seal assembly is located between said second annular seal assembly and the power end:
said third annular seal assembly is located between said first annular seal assembly and the power end, whereby each seal and seal assembly is subjected to a portion of the differential pressure between the fluid end and power end.

* * * * *